(12) United States Patent
Sha et al.

(10) Patent No.: US 11,087,053 B1
(45) Date of Patent: Aug. 10, 2021

(54) METHOD, ELECTRONIC DEVICE, AND COMPUTER PROGRAM PRODUCT FOR INFORMATION DISPLAY

(71) Applicant: EMC IP Holding Company LLC, Hopkinton, MA (US)

(72) Inventors: Danqing Sha, Shanghai (CN); Qiang Chen, Shanghai (CN); Zhen Jia, Shanghai (CN); Xuwei Tang, Nanjing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/934,258

(22) Filed: Jul. 21, 2020

(30) Foreign Application Priority Data

Jun. 30, 2020 (CN) .......................... 202010621934.2

(51) Int. Cl.
*G06F 30/20* (2020.01)
*G06T 11/00* (2006.01)
(Continued)

(52) U.S. Cl.
CPC ............ *G06F 30/20* (2020.01); *G06F 3/1454* (2013.01); *G06F 16/955* (2019.01); *G06T 11/00* (2013.01); *G06F 3/013* (2013.01); *G06F 2111/18* (2020.01)

(58) Field of Classification Search
CPC ........ G06F 3/011; G06F 3/013; G06F 3/1454; G06F 16/955; G06F 30/20;
(Continued)

(56) References Cited

U.S. PATENT DOCUMENTS 5,956,665 A 9/1999 Martinez et al.
6,384,842 B1 5/2002 DeKoning et al.
(Continued)

OTHER PUBLICATIONS

Intel, "Monitoring Media Wearout Levels of Intel Solid-State Drives," Technology Brief, 2011, 2 pages.
(Continued)

*Primary Examiner* — Sae Won Yoon
(74) *Attorney, Agent, or Firm* — Ryan, Mason & Lewis, LLP

(57) ABSTRACT

Embodiments of the present disclosure relate to a method, an electronic device, and a computer program product for information display. In one embodiment, a method for information display includes: acquiring original information associated with an infrastructure for information processing in the real world; visualizing at least a portion of the original information to generate visualized information, wherein the visualized information includes at least one of visualized environmental information associated with an environment in which the infrastructure is located, visualized hardware information associated with hardware in the infrastructure, visualized data processing information associated with data processing performed by the infrastructure, and a visualized analysis result obtained by analyzing the original information; and presenting the visualized information in a virtual world displayed by at least one virtual reality device, wherein the virtual world simulates the real world and includes a virtual representation of the infrastructure. Therefore, infrastructure management can be improved.

20 Claims, 4 Drawing Sheets

(51) Int. Cl.
*G06F 16/955* (2019.01)
*G06F 3/14* (2006.01)
*G06F 111/18* (2020.01)
*G06F 3/01* (2006.01)

(58) Field of Classification Search
CPC ...... G06F 2111/18; G06T 11/00; G06T 15/00; G06T 19/00; G06T 19/003; G06T 19/006
USPC .......................................................... 345/441
See application file for complete search history.

(56) References Cited

U.S. PATENT DOCUMENTS

| | | | |
|---|---|---|---|
| 7,322,010 | B1 | 1/2008 | Mikula |
| 7,369,061 | B1 | 5/2008 | Sellers |
| 7,447,807 | B1 | 11/2008 | Merry et al. |
| 8,836,580 | B2 | 9/2014 | Mendelson |
| 8,930,134 | B2 | 1/2015 | Gu et al. |
| 9,958,277 | B1 | 5/2018 | Espy et al. |
| 9,959,190 | B2 | 5/2018 | Klein et al. |
| 10,409,523 | B1 | 9/2019 | Kim et al. |
| 10,410,424 | B1 | 9/2019 | Khokhar et al. |
| 10,873,724 | B1* | 12/2020 | Little .................... G06F 16/29 |
| 2005/0090911 | A1 | 4/2005 | Ingargiola et al. |
| 2006/0053447 | A1 | 3/2006 | Krzyzanowski et al. |
| 2006/0095662 | A1 | 5/2006 | Arnott |
| 2006/0247849 | A1 | 11/2006 | Mohsini et al. |
| 2007/0069923 | A1 | 3/2007 | Mendelson |
| 2007/0219645 | A1* | 9/2007 | Thomas ................. G05B 15/02 700/29 |
| 2007/0294032 | A1 | 12/2007 | Zumsteg et al. |
| 2008/0040522 | A1 | 2/2008 | Matthews |
| 2009/0003353 | A1 | 1/2009 | Ding et al. |
| 2009/0249213 | A1 | 10/2009 | Murase et al. |
| 2010/0070169 | A1 | 3/2010 | Paulin et al. |
| 2010/0094536 | A1 | 4/2010 | Lee et al. |
| 2010/0191908 | A1 | 7/2010 | Yamakawa |
| 2010/0317420 | A1 | 12/2010 | Hoffberg |
| 2011/0115816 | A1 | 5/2011 | Brackney |
| 2011/0222548 | A1 | 9/2011 | Conway |
| 2011/0310120 | A1 | 12/2011 | Narayanan |
| 2012/0090004 | A1 | 4/2012 | Jeong |
| 2012/0239319 | A1 | 9/2012 | Singh |
| 2012/0311260 | A1 | 12/2012 | Yamagiwa et al. |
| 2013/0031202 | A1 | 1/2013 | Mick et al. |
| 2013/0114100 | A1 | 5/2013 | Torii et al. |
| 2014/0025414 | A1 | 1/2014 | Worden et al. |
| 2014/0114560 | A1 | 4/2014 | Jensen et al. |
| 2014/0173474 | A1 | 6/2014 | Klemenz et al. |
| 2014/0180572 | A1 | 6/2014 | Acker, Jr. et al. |
| 2014/0195454 | A1 | 7/2014 | Richie et al. |
| 2014/0304342 | A1 | 10/2014 | Shekhar |
| 2015/0051994 | A1 | 2/2015 | Ward et al. |
| 2015/0126129 | A1 | 5/2015 | Rangappagowda et al. |
| 2015/0133152 | A1 | 5/2015 | Edge et al. |
| 2015/0277931 | A1 | 10/2015 | Staude et al. |
| 2016/0029158 | A1 | 1/2016 | Hansen |
| 2016/0086141 | A1 | 3/2016 | Jayanthi et al. |
| 2016/0127871 | A1 | 5/2016 | Smith et al. |
| 2016/0196584 | A1 | 7/2016 | Franklin et al. |
| 2017/0012996 | A1 | 1/2017 | Hu et al. |
| 2017/0017617 | A1 | 1/2017 | Sato et al. |
| 2017/0228161 | A1 | 8/2017 | Nangoh |
| 2017/0277559 | A1* | 9/2017 | Mullins .................. G06F 3/011 |
| 2017/0285943 | A1 | 10/2017 | Dalmatov |
| 2017/0285972 | A1 | 10/2017 | Dalmatov |
| 2017/0288945 | A1 | 10/2017 | Chandangoudar |
| 2017/0372516 | A1* | 12/2017 | Evans .................... G06T 15/20 |
| 2018/0018822 | A1 | 1/2018 | Zagrebin et al. |
| 2018/0035606 | A1 | 2/2018 | Burdoucci |
| 2018/0046851 | A1* | 2/2018 | Kienzle .................. G06F 3/013 |
| 2018/0061129 | A1* | 3/2018 | Sisbot .................. G06T 19/006 |
| 2018/0130260 | A1* | 5/2018 | Schmirler ............ G06T 19/006 |
| 2018/0158209 | A1 | 6/2018 | Fine et al. |
| 2018/0204385 | A1* | 7/2018 | Sarangdhar ............ G08C 17/02 |
| 2018/0239991 | A1 | 8/2018 | Weller et al. |
| 2018/0349367 | A1* | 12/2018 | Soni ...................... G06F 16/148 |
| 2020/0117336 | A1* | 4/2020 | Mani ...................... G06F 3/0304 |
| 2020/0184217 | A1* | 6/2020 | Faulkner ............. G06K 9/00671 |
| 2020/0210538 | A1* | 7/2020 | Wang ..................... G06F 30/20 |
| 2020/0401912 | A1* | 12/2020 | Sert .......................... G06F 3/14 |

OTHER PUBLICATIONS

Y. Park et al., "Self-Controllable Secure Location Sharing for Trajectory-Based Message Delivery on Cloud-Assisted VANETs," Sensors (Basel), Jul. 1, 2018, 23 pages.

Nintendo, "Pokemon GO," https://www.pokemon.com/us/pokemon-video-games/pokemon-go/, 2019, 12 pages.

E. Kim, "DeepBLE—Localized Navigation Using Low Energy Bluetooth," University of Pennsylvania School of Engineering and Applied Science, 2013-2014, 7 pages.

U.S. Appl. No. 16/261,941 filed in the name of Brian C. Mullins et al. filed Jan. 30, 2019, and entitled "Location Assurance Using Location Indicators Modified by Shared Secrets."

U.S. Appl. No. 16/882,870 filed in the name of Zhen Jia et al. filed May 26, 2020, and entitled "Method, Device, and Computer Program Product for Managing Application Environment."

* cited by examiner

METHOD, ELECTRONIC DEVICE, AND COMPUTER PROGRAM PRODUCT FOR INFORMATION DISPLAY

RELATED APPLICATION(S)

The present application claims priority to Chinese Patent Application No. 202010621934.2, filed Jun. 30, 2020, and entitled "Method, Electronic Device, and Computer Program Product for Information Display," which is incorporated by reference herein in its entirety.

FIELD

Embodiments of the present disclosure generally relate to information display, and in particular, to a method, an electronic device, and a computer program product for information display.

BACKGROUND

In recent years, the virtual reality (VR) technology has been growing rapidly. The VR technology can provide vivid context and immersive experience. The VR technology's capability of presenting visualized information in a clear and intuitive way allows it to form an ideal visualization platform. Therefore, the VR technology can be used to improve many industries.

The traditional design of information processing infrastructures (such as an IT infrastructure) has various shortcomings. For example, infrastructure design is mainly based on unintuitive 2D computer-aided design or 3D physical models. Users cannot immediately visualize and perceive the design of the infrastructures. In addition, the design based on 2D computer-aided design or 3D physical models cannot provide performance-based data analysis at the design stage. In this case, the VR technology is needed to improve the infrastructure design.

SUMMARY

The embodiments of the present disclosure provide a method, an electronic device, and a computer program product for information display.

In a first aspect of the present disclosure, there is provided a method for information display. The method includes: acquiring original information associated with at least one infrastructure for information processing in the real world; visualizing at least a portion of the original information to generate visualized information, wherein the visualized information includes at least one of visualized environmental information associated with an environment in which the at least one infrastructure is located, visualized hardware information associated with hardware in the at least one infrastructure, visualized data processing information associated with data processing performed by the at least one infrastructure, and a visualized analysis result obtained by analyzing the original information; and presenting the visualized information in a virtual world displayed by at least one virtual reality device, wherein the virtual world simulates the real world and includes a virtual representation of the at least one infrastructure.

In a second aspect of the present disclosure, there is provided an electronic device. The device includes at least one processing unit and at least one memory. The at least one memory is coupled to the at least one processing unit and stores instructions configured to be executed by the at least one processing unit. The instructions, when executed by the at least one processing unit, cause the device to perform actions including: acquiring original information associated with at least one infrastructure for information processing in the real world; visualizing at least a portion of the original information to generate visualized information, wherein the visualized information includes at least one of visualized environmental information associated with an environment in which the at least one infrastructure is located, visualized hardware information associated with hardware in the at least one infrastructure, visualized data processing information associated with data processing performed by the at least one infrastructure, and a visualized analysis result obtained by analyzing the original information; and presenting the visualized information in a virtual world displayed by at least one virtual reality device, wherein the virtual world simulates the real world and includes a virtual representation of the at least one infrastructure.

In a third aspect of the present disclosure, there is provided a computer program product. The computer program product is tangibly stored on a non-transitory computer readable medium and includes machine-executable instructions; and the machine-executable instructions, when executed, cause a machine to perform any step of the method described according to the first aspect of the present disclosure.

This Summary is provided in a simplified form to introduce the selection of concepts, which will be further described in the Detailed Description below. The Summary is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Figure 1:
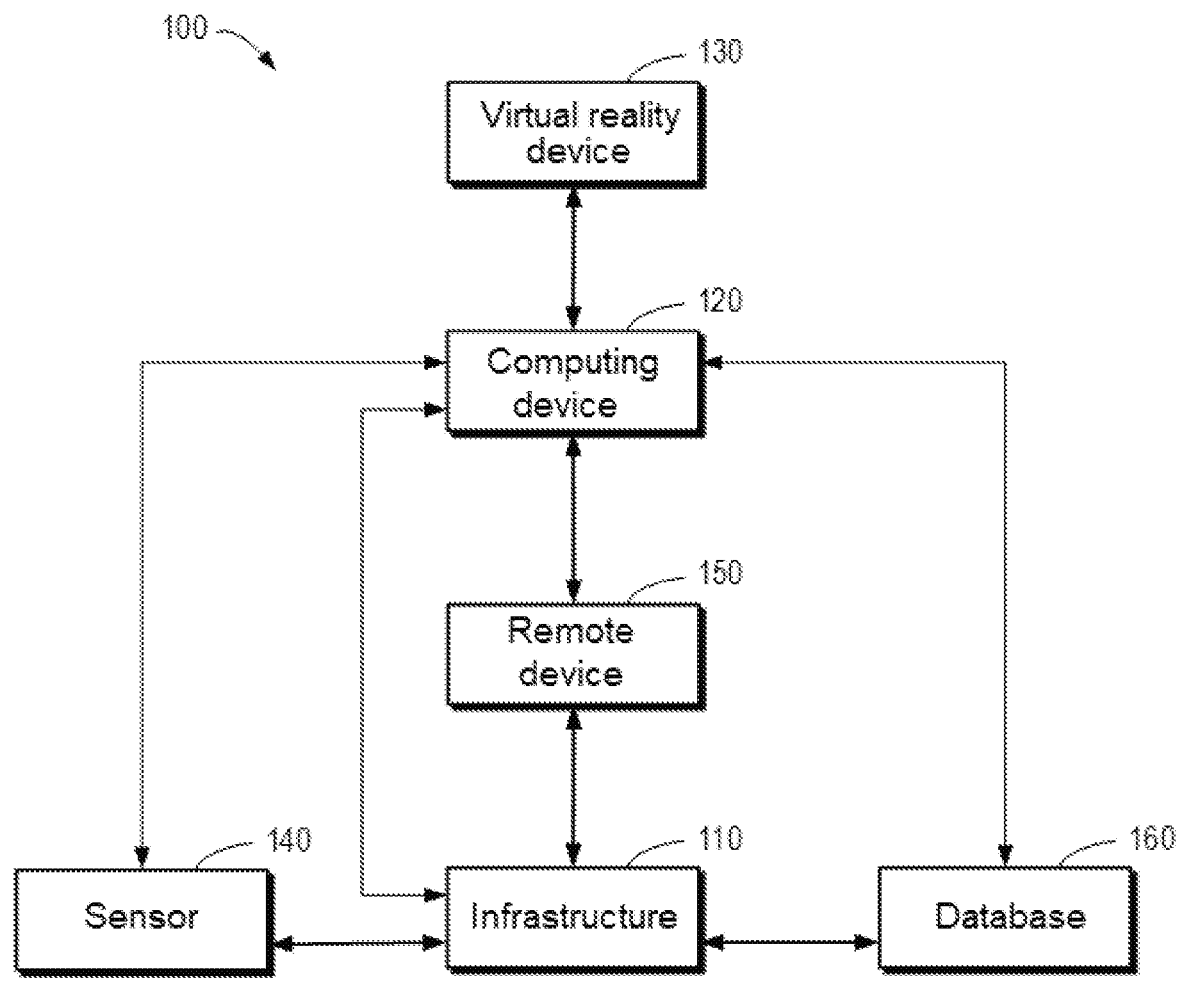
FIG. 1 shows a schematic diagram of an example environment in which some embodiments of the present disclosure can be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, infrastructure design has various shortcomings. For example, these shortcomings are mainly reflected in the following five aspects. In terms of cross-traditional infrastructure management tools and/or platforms, users may use a variety of different tools and/or platforms for infrastructure management, and therefore different professional skills are required to operate these tools and/or platforms. In addition, some of the tools and/or platforms utilized by the users may be independent and cannot be connected to each other. This will significantly reduce the efficiency of infrastructure management.

In terms of data visualization, traditional infrastructure management tools and/or platforms usually only present the hardware status, environmental parameters, management processes, etc. of the infrastructures in a 2D form. However, this presentation is not intuitive. In addition, these tools and/or platforms do not present any analysis and insight on the infrastructures.

In terms of remote monitoring, traditional infrastructure management tools and/or platforms usually do not provide remote monitoring capabilities. However, most technicians are not experts on all hardware in the infrastructures, and experts may not always be able to arrive at the site for technical support. For example, a traditional technical support model requires the following three conditions to be met: 1) detecting and reporting faults or errors; 2) notifying a user, and technicians being capable of providing on-site support for the faults or errors; and 3) the technicians reporting in a specific service level agreement. However, the technicians who provide on-site support are usually junior technicians who lack necessary skills, so senior technicians with the necessary skills have to travel to provide on-site support within the time agreed in a service level agreement. This may cause the technicians to spend time for traveling to and from the site significantly longer than the overall diagnosis and maintenance time of the users and the technicians.

In terms of data analysis, a traditional infrastructure management process does not utilize a large amount of data from various databases, or provide data analysis, thus providing only very limited information to the users.

In terms of collaborative work, it is impossible to support collaborative work among multiple users during the troubleshooting or maintenance of traditional infrastructures. The technicians need to work with other technicians to resolve faults or perform maintenance on site. If a problem cannot be readily solved, a technician who can solve the problem also has to arrive at the site.

According to an example embodiment of the present disclosure, an improved solution for information display is proposed. In the solution, original information associated with at least one infrastructure for information processing in the real world is acquired; at least a portion of the original information is visualized to generate visualized information, wherein the visualized information includes at least one of visualized environmental information associated with an environment in which the at least one infrastructure is located, visualized hardware information associated with hardware in the at least one infrastructure, visualized data processing information associated with data processing performed by the at least one infrastructure, and a visualized analysis result obtained by analyzing the original information; and the visualized information is presented in a virtual world displayed by at least one virtual reality device, wherein the virtual world simulates the real world and includes a virtual representation of the at least one infrastructure.

In this way, the solution can apply the VR technology to infrastructure design, thereby avoiding the potential expensive process of testing physical infrastructures. The VR technology can intuitively display various states of an infrastructure, and can provide design testing (such as layout testing and performance testing) in the early stages of infrastructure design. For example, through the VR technology, a user can directly see the layout of the infrastructure or the arrangement of hardware in the infrastructure, and can improve the design by adjusting parameters of the infrastructure. As a result, potential problems may be tested and solved in the design process, and then the successful design is applied to an actual system without wasting extra costs due to improper design. In addition, the solution also allows multiple users to work together in a shared view, thereby improving the design efficiency.

In the following, specific examples of the solution will be described in more detail with reference to FIG. 1 to FIG. 4. FIG. 1 shows a schematic diagram of example environment 100 according to some embodiments of the present disclosure. Environment 100 includes infrastructure 110, computing device 120, and virtual reality device 130. Infrastructure 110 may represent a physical device used for information processing in the real world, such as but not limited to a server, a router, a switch, etc. and combinations of these devices or hardware components in these devices. It should be understood that although only one infrastructure is shown in FIG. 1 for clarity, the number of the infrastructure is not limited to this and may be any suitable larger or smaller number. For example, the infrastructure may actually represent a data center with a plurality of infrastructures.

Computing device 120 may acquire the original information associated with infrastructure 110 from various sources, and visualize at least a portion of the original information to present the visualized information in the virtual world displayed by virtual reality device 130. The virtual world simulates the real world and includes a virtual representation of infrastructure 110. For example, the virtual world may include building structures and layouts (HVAC systems, walls, pipes, etc.) in the real world, various devices (racks, cable connections, servers, storage devices, etc.), etc.

Computing device 120 may be any suitable type of device, such as a mobile phone, a tablet computer, a personal computer, a portable computer, a desktop computer, a personal digital assistant (PDA), etc. In addition, it should be understood that computing device 120 may be embedded in infrastructure 110 or virtual reality device 130 or as an independent device external to infrastructure 110 or virtual reality device 130.

Virtual reality device 130 may be any suitable device that supports the VR technology, including but not limited to a head-mounted display, a binocular omni-directional display, LCD shutter glasses, a large-screen projection, a CAVE type virtual reality display system, smart glasses, a smart phone, a tablet computer, a desktop computer, a laptop computer, etc. For example, a user using virtual reality device 130 can navigate in the virtual world to view the virtual representation of the infrastructure, and use gestures, eye gaze, controllers, etc. to acquire, control, or change the visualized information and parameters or settings of the infrastructure or a sensor corresponding to the visualized information.

Specifically, computing device 120 may acquire the original information from at least one source of infrastructure 110, sensor 140, remote device 150, and database 160 respectively. Infrastructure 110 may provide computing device 120 with original hardware information associated with hardware in infrastructure 110. For example, the hardware may include processing resources (such as a central processing unit (CPU), a graphics processing unit (GPU), etc.), network resources, storage resources (such as a memory, an optical storage device, a magnetic storage device, etc.) and status indicators (such as LED Lights, warning lights, etc.). In this case, the original hardware information may include the state, performance, and usage conditions of the hardware.

Sensor 140 may be configured to monitor infrastructure 110 and the environment in which infrastructure 110 is located. These sensors may be installed inside infrastructure 110 or outside infrastructure 110 to be independent of infrastructure 110. Sensor 140 may have any suitable form, and may be, for example, a camera, a smoke detector, a temperature sensor, a humidity sensor, a presence sensor, a thermostat, a gas detector, and/or a gunshot sensor, etc. Thus, computing device 120 may acquire the original environmental information sensed or captured by multiple sensors 140. For example, the original environmental information may be images, videos, smoke concentrations, temperatures, humidity, infrared information, specific gas contents, and/or decibels of gunshots, etc.

Remote device 150 may be a device that performs distributed data processing with infrastructure 110. Data may be processed at a local infrastructure and a remote device to form a data processing pipeline. The local infrastructure (for example, a local edge server) may perform data acquisition and simple data processing. The remote device (for example, a remote core server, cloud, etc.) may perform more complex data processing. For example, the remote core server may perform more computationally intensive data fusion and analysis. The cloud may use a large amount of historical data for more advanced artificial intelligence or machine learning tasks to make long-term decisions. Data can be exchanged between infrastructure 110 and remote device 150 via a network. The network may be, for example, any suitable wired or wireless network, such as a fiber optic network, a 5G network, etc. Thus, computing device 120 may acquire original data processing information associated with such a data processing pipeline from infrastructure 110 and remote device 150. For example, the original data processing information may be network parameters, data processing statuses, and/or data transmission statuses.

Database 160 may be, for example, a historical hardware information database, a historical environmental information database, a knowledge database, a risk model database, an expert database, a troubleshooting process database, and/or an operation process database. Thus, computing device 120 may acquire additional information from multiple databases 160. In this case, the additional information may be, for example, historical hardware information, historical environmental information, knowledge segments, risk models, professional information, troubleshooting process information, and/or operation process information.

Computing device 120 may visualize the original information to generate the visualized information. In some embodiments, the visualized information may include the visualized environmental information associated with the environment in which infrastructure 110 is located, the visualized hardware information associated with the hardware in infrastructure 110, the visualized data processing information associated with the data processing performed by infrastructure 110, and/or the visualized analysis result obtained by analyzing the original information.

For example, the visualized environmental information may be visualized representations of videos, smoke concentrations, temperatures, humidity, infrared information, specific gas contents, and/or decibels of gunshots. The visualized hardware information may be visualized representations of the status, performance, and/or usage conditions of the hardware in infrastructure 110. The visualized data processing information may be visualized representations of network parameters, data processing statuses, and/or data transmission statuses. The visualized analysis result may be visualized representations of operation and maintenance advice and/or predictions for infrastructure 110. Thus, computing device 120 may present the visualized information in the virtual world displayed by virtual reality device 130.

In addition, computing device 120 may also support remote control. Computing device 120 may transmit the visualized information to virtual reality device 130 via a network to present the visualized information in the virtual world. The network may be, for example, any suitable wired or wireless network, such as a fiber optic network, a 5G network, etc. In addition, virtual reality device 130 may receive a request for changing the visualized information from virtual reality device 130 through the network to change the visualized information and the parameters or settings of the infrastructure or a sensor corresponding to the changed visualized information. For example, a user may input the request for changing the visualized information through eye gaze, gestures, a controller, etc. to view, manipulate, or control the visualized information.

In addition, computing device 120 may also support data analysis. Computing device 120 may use a data analysis model to analyze the original information to obtain an analysis result. For example, the analysis results may include operation advice, maintenance advice, and/or prediction advice for infrastructure 110.

Further, computing device 120 may also support collaborative work among multiple users. Multiple users may be in the same virtual world, and may collaborate with each other in infrastructure operation, maintenance, troubleshooting, etc.

In this way, the solution can provide various advantages. For example, it can provide a more intuitive information presentation. It can convey real-time information and improve system efficiency and accuracy. It can allow real-time update of information, so that the users can record detailed notes or descriptions. By using various data analysis models, the impact of design changes, usage scenarios, environmental conditions, and various other variables can be indicated without the need to develop physical prototypes, thereby reducing development time and improving the quality of a final product or process. By supporting remote control and collaborative work, collaboration between the users can be made easier and more efficient. By presenting the visualized information in the virtual world, efficiency in operation, maintenance, and troubleshooting can be improved. Due to the realization of automation and seamless control, the user experience is improved. By integrating various traditionally unconnected systems (from an HVAC system to a hardware system), new understandings and insights can be acquired, which can optimize workflow and improve work efficiency.

Figure 2:
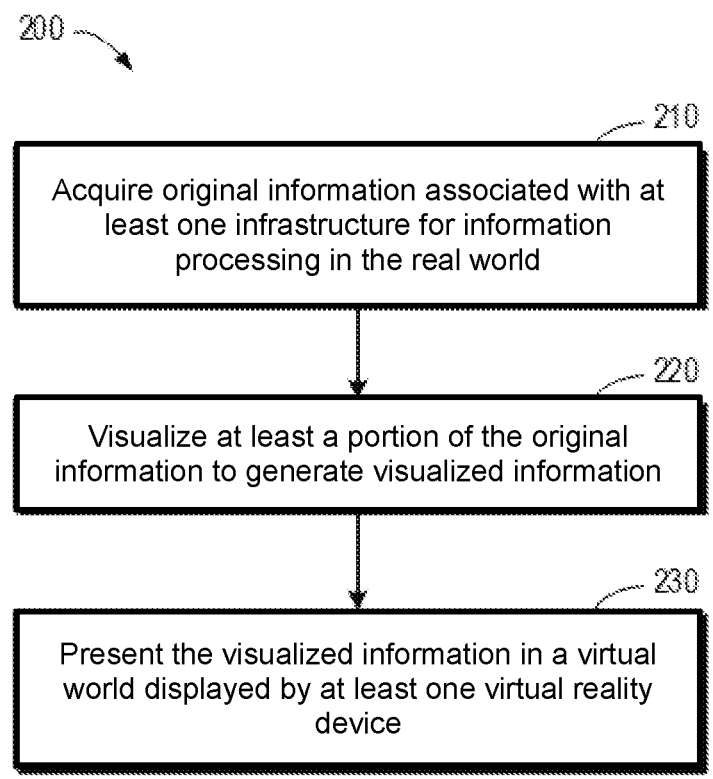
FIG. 2 shows a flowchart of a method for information display according to some embodiments of the present disclosure.

FIG. 2 shows a flowchart of method 200 for information display according to some embodiments of the present disclosure. For example, method 200 may be performed by computing device 120 as shown in FIG. 1. It should be understood that method 200 may further include additional steps that are not shown and/or may omit the shown steps, and the scope of the present disclosure is not limited in this aspect.

In 210, computing device 120 acquires original information associated with infrastructure 110 for information processing in the real world. As mentioned above, the original information may be acquired from various sources. For example, computing device 120 may acquire original environmental information from sensor 140 configured to monitor infrastructure 110. Computing device 120 may further acquire original hardware information associated with hardware in infrastructure 110 from infrastructure 110. In addition, computing device 120 may further acquire original data processing information associated with data processing from infrastructure 110 and/or remote device 150. Further, computing device 120 may acquire additional information from various additional databases 160. As mentioned above, databases 160 may be, for example, a historical hardware information database, a historical environmental information database, a knowledge database, a risk model database, an expert database, a troubleshooting process database, and/or an operation process database.

In 220, computing device 120 visualizes at least a portion of the original information to generate visualized information. For example, the visualized information may include the visualized environmental information associated with an environment in which infrastructure 110 is located, the visualized hardware information associated with the hardware in infrastructure 110, the visualized data processing information associated with the data processing performed by infrastructure 110, and/or a visualized analysis result obtained by analyzing the original information.

In order to generate the visualized environmental information, the original environmental information may be fused together through an environmental information fusion model and a real-time situation may be determined. Then, environmental information to be provided to a user may be decided based on the real-time situation. For example, in the case where a temperature exceeds a predetermined threshold, the environmental information fusion model may determine that the real-time situation is that the environment in which the infrastructure is located is too hot, thereby deciding to provide temperature information to the user. In this case, the visualized environmental information about the temperature may be generated.

Specifically, in some embodiments, computing device 120 acquires the environmental information fusion model. The environmental information fusion model may determine the environmental information to be provided to the user based on the original environmental information. Computing device 120 may apply the original environmental information to the environmental information fusion model to determine the environmental information to be provided to the user. Computing device 120 may visualize the environmental information to be provided to the user to generate the visualized environmental information. In some embodiments, before applying the original environmental information to the environmental information fusion model, the original environmental information may further be preprocessed and/or missing environmental information in the original environmental information may be filled, and the processed original environmental information is applied to the environmental information fusion model.

In addition, in some embodiments, there are usually a plurality of infrastructures in a data center. In order to reduce the user's cognitive burden, only hardware information that the user cares about may be visualized. In this case, in order to generate the visualized hardware information, computing device 120 may determine a corresponding attention degree of the user to each of at least one infrastructure 110, and determine the infrastructure whose attention degree exceeds a threshold attention degree as a target infrastructure. Computing device 120 may select part of hardware information associated with the target infrastructure from the original hardware information, and visualize the selected part of hardware information to generate the visualized hardware information.

The attention degree may depend on the distance of the user from the infrastructure in the virtual world. For example, the closer the distance, the higher the attention degree. Therefore, the infrastructure that the user just navigates to may be considered as the target infrastructure. In addition, the attention degree may depend on eye gaze of the user. For example, the infrastructure that is gazed at by the user has a high attention degree, so it may be considered as the target infrastructure. In addition, the attention degree may also depend on selection of the user through gestures or a controller. The infrastructure selected by the user has a high attention degree, so it may be considered as the target infrastructure.

In addition, as described above, remote device 150 and infrastructure 110 may perform distributed data processing to form a data processing pipeline. Data may be exchanged between infrastructure 110 and remote device 150 via a network. Thus, the visualized data processing information associated with such a data processing pipeline may be generated. For example, the visualized data processing information may be network parameters, data processing statuses, and/or data transmission statuses.

Further, analyzing the original information may solve the problem before it occurs, prevent infrastructure downtime, explore new opportunities, and plan for the future. Therefore, in order to generate the visualized analysis results, computing device 120 may use a data analysis model to analyze the original information to obtain an analysis result. The data analysis model may be any suitable model that can analyze the original information, such as a machine learning model, a neural network model, an artificial intelligence model, and so on.

In some embodiments, the analysis result may include operation advice, maintenance advice, and/or prediction advice for infrastructure 110. For example, the analysis result may involve daily operational data summaries, advice for debugging and maintenance, troubleshooting guidelines, reminders of upcoming maintenance plans or potential problems, advice for current and future operations, potential risk reminders, path searching, predictive maintenance advice, operational plans, resource allocation and management, and so on. Computing device 120 may visualize the analysis result to generate the visualized analysis result.

Figure 3:
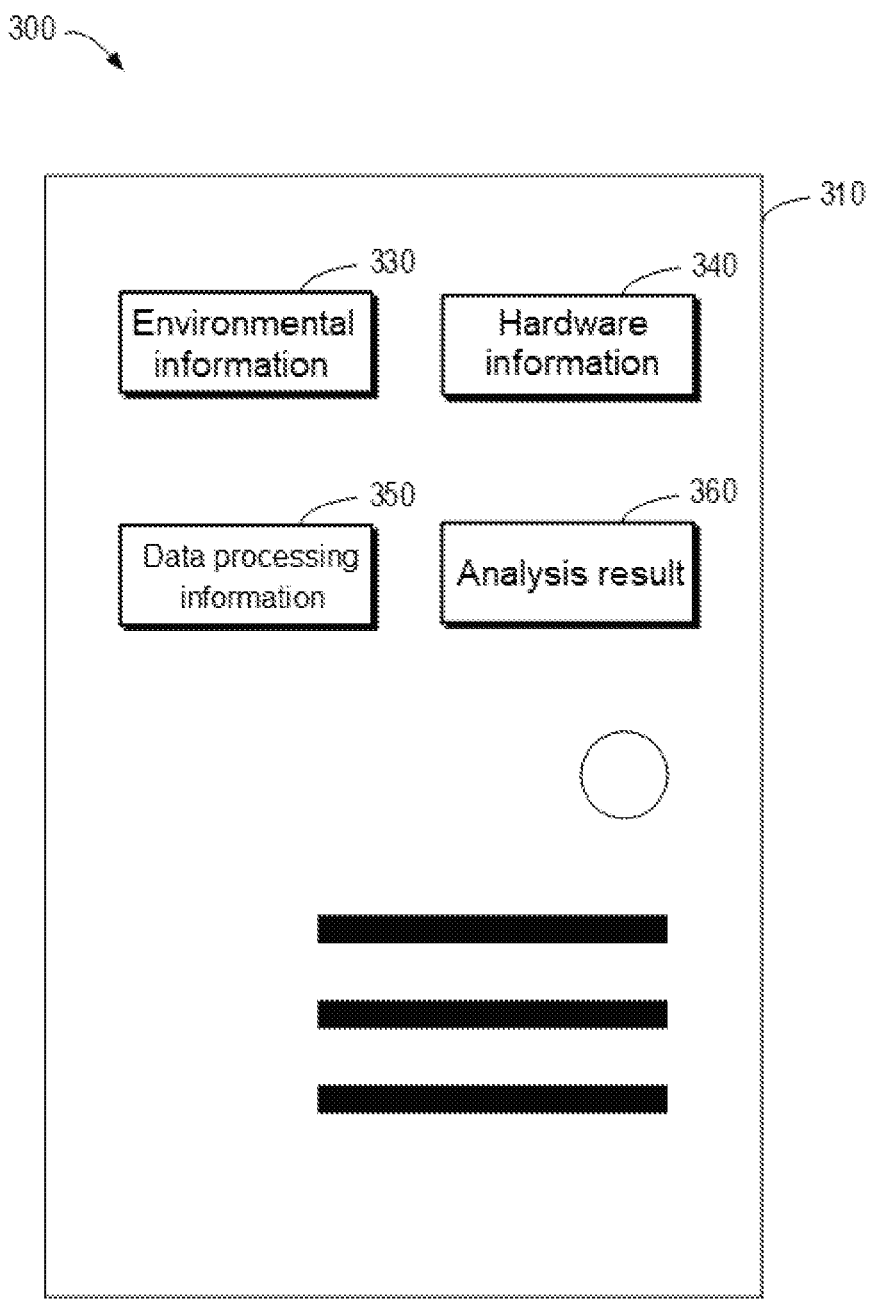
FIG. 3 shows a schematic diagram of examples of a virtual world and visualized information therein according to some embodiments of the present disclosure.

Thus, in 230, computing device 120 may present the visualized information in the virtual world displayed by virtual reality device 130. FIG. 3 shows schematic diagram 300 of an example of a virtual world and visualized information therein according to some embodiments of the present disclosure. As shown in FIG. 3, there is virtual representation 310 of infrastructure 110 in the virtual world. Visualized environmental information 330, visualized hardware information 340, visualized data processing information 350, and visualized analysis result 360 are included in virtual representation 310. For example, a user using virtual reality device 130 may navigate in the virtual world to view virtual representation 310 of infrastructure 110, and use gestures, eye gaze, controllers, etc. to acquire, control, or change the presented visualized information and parameters or settings of infrastructure 110 or sensor 140 corresponding to the visualized information.

Further, as mentioned above, the solution can provide the capabilities of remote control and collaborative work. In this case, when any problem occurs in infrastructure 110, a site technician or a remote technician can share a view of the relevant situation in their virtual reality device 130. When each technician has a common understanding of the relevant situation, the problem can be solved more effectively. If problems are detected, these technicians can remotely view, control, and collaborate in the virtual world without having to reach the scene. In addition, the technicians can provide advice for troubleshooting or maintenance, and immediately see the results in the virtual world.

Therefore, in some embodiments, in order to realize remote control, computing device 120 may transmit the visualized information to virtual reality device 130 via a network to present the visualized information in the virtual world. The network may be, for example, any suitable wired or wireless network, such as a fiber optic network, a 5G network, etc.

In addition, in order to achieve collaborative work, computing device 120 may receive a request to change the visualized information from a virtual reality device, and based on the request, change the visualized information. Further, computing device 120 may present the changed visualized information in the virtual world displayed by the virtual reality device that sends the request and another virtual reality device collaboratively working with said virtual reality device.

In this way, the solution can provide a more intuitive information presentation. It can convey real-time information and improve system efficiency and accuracy. It can allow real-time update of information, so that the users can record detailed notes or descriptions. By using various data analysis models, the impact of design changes, usage scenarios, environmental conditions, and various other variables can be indicated without the need to develop physical prototypes, thereby reducing development time and improving the quality of a final product or process. By supporting remote control and collaborative work, collaboration between the users can be made easier and more efficient. By presenting the visualized information in the virtual world, efficiency in operation, maintenance, and troubleshooting can be improved. Due to the realization of automation and seamless control, the user experience is improved. By integrating various traditionally unconnected systems (from an HVAC system to a hardware system), new understandings and insights can be acquired, which can optimize workflow and improve work efficiency.

In addition, in order to further help understanding, in the following, two user scenarios will be described. In one user scenario, an infrastructure technician wants to check the real-time status of the infrastructure in an office or at home. By using the virtual reality device, the technician can view the virtual world including the virtual representation of the infrastructure and various visualized information. By viewing the visualized information, the technician can perform routine inspections remotely. If any warning or error is detected, the technician can navigate to the problematic hardware and perform remote troubleshooting. Through remote monitoring and troubleshooting, a lot of work required for on-site support can be saved, and when on vacation, the technician can also conduct routine inspections and troubleshooting.

In addition, if the technician is required to arrive at the infrastructure site and troubleshoot, the problem can also be diagnosed remotely first, so as to order necessary equipment and parts. Similarly, when a new infrastructure is to be debugged for a customer, the infrastructure can also be configured remotely by the technician.

Figure 4:
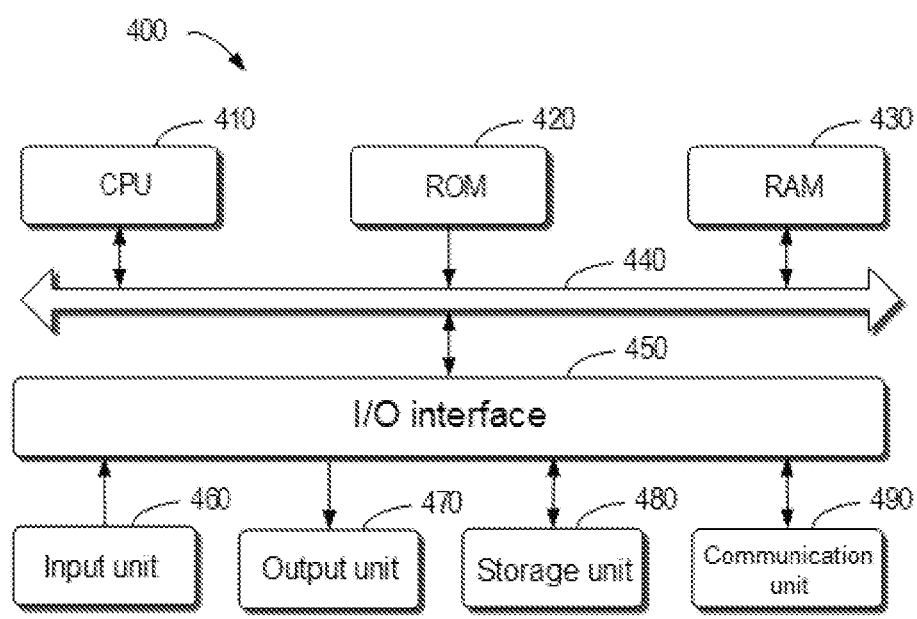
FIG. 4 shows a schematic block diagram of an example device that can be configured to implement an embodiment of the present disclosure.

In another user scenario, if any warning or error is detected, the technician can be connected with problematic hardware in the virtual world and try to perform troubleshooting. However, the technician is not familiar with the problem. After many attempts, the technician still could not solve the problem and did not know how to proceed. At this time, the technician can seek help from a remote expert. The remote expert can use his/her virtual reality device to share the virtual world with the technician, control the infrastructure, and perform troubleshooting. Thus, the technician and the remote expert can work collaboratively until the problem is solved. FIG. 4 shows a schematic block diagram of example device 400 that can be configured to implement an embodiment of the present disclosure. For example, computing device 120 as shown in FIG. 1 may be implemented by device 400. As shown in the figure, device 400 includes central processing unit (CPU) 410 that may perform various appropriate actions and processing according to computer program instructions stored in read-only memory (ROM) 420 or computer program instructions loaded from storage unit 480 to random access memory (RAM) 430. In RAM 430, various programs and data required for the operation of device 400 may also be stored. CPU 410, ROM 420, and RAM 430 are connected to each other through bus 440. Input/output (I/O) interface 450 is also connected to bus 440.

A plurality of components in device 400 are coupled to I/O interface 450, including: input unit 460, such as a keyboard and a mouse; output unit 470, such as various types of displays and speakers; storage unit 480, such as a magnetic disk and an optical disc; and communication unit 490, such as a network card, a modem, and a wireless communication transceiver. Communication unit 490 allows device 400 to exchange information/data with other devices over a computer network such as the Internet and/or various telecommunication networks.

The various processes and processing described above, for example, method 200, may be performed by processing unit 410. For example, in some embodiments, method 200 may be implemented as a computer software program that is tangibly included in a machine-readable medium such as storage unit 480. In some embodiments, some or all of the computer programs may be loaded and/or installed onto device 400 through ROM 420 and/or communication unit 490. When the computer program is loaded into RAM 430 and executed by CPU 410, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (the system), and the computer program product according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of the blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and changes are apparent to those of ordinary skill in the art without departing from the scope and spirit of the various illustrated embodiments. The selection of terms used herein is intended to best explain the principles and practical applications of the embodiments or the technological improvements to technologies on the market, and to otherwise enable persons of ordinary skill in the art to understand the embodiments disclosed herein.

What is claimed is:

1. A method for information display, comprising:
   acquiring original information associated with at least one infrastructure comprising one or more physical devices for information processing in a real world, wherein the original information comprises original hardware information associated with one or more hardware components of the one or more physical devices in the at least one infrastructure, and the original hardware information is acquired from the one or more physical devices in the at least one infrastructure;
   visualizing at least a portion of the original information to generate visualized information, wherein the visualized information comprises visualized original hardware information associated with the one or more hardware components of the one or more physical devices in the at least one infrastructure; and
   presenting the visualized information in a virtual world displayed by at least one virtual reality device, wherein the virtual world simulates the real world and comprises a virtual representation of the at least one infrastructure;
   wherein generating the visualized information comprises:
      determining a corresponding attention degree of a user of the at least one infrastructure;
      determining, in the at least one infrastructure, one infrastructure whose attention degree exceeds a threshold attention degree as a target infrastructure;
      selecting part of the original hardware information associated with the target infrastructure from the original hardware information; and
      visualizing the selected part of the original hardware information to generate the visualized original hardware information.

2. The method according to claim 1, wherein acquiring the original information further comprises:
   acquiring original environmental information from a sensor configured to monitor the at least one infrastructure.

3. The method according to claim 2, wherein generating the visualized information further comprises:
   acquiring an environmental information fusion model configured to determine a particular environmental information to be provided to the user based on the original environmental information;
   applying the original environmental information to the environmental information fusion model to determine the particular environmental information to be provided to the user; and
   visualizing the particular environmental information to be provided to the user to generate the visualized environmental information.

4. The method according to claim 1, wherein acquiring the original information further comprises at least one of the following:
   acquiring original data processing information associated with data processing from the at least one infrastructure; and
   acquiring additional information from at least one database associated with the at least one infrastructure, wherein the at least one database comprises at least one of the following: a historical hardware information database, a historical environmental information database, a knowledge database, a risk model database, an expert database, a troubleshooting process database, and an operation process database.

5. The method according to claim 1, wherein generating the visualized information further comprises:
   analyzing the original information by using a data analysis model to obtain a particular analysis result, wherein the particular analysis result comprises at least one of operation advice, maintenance advice, and prediction advice for the at least one infrastructure; and
   visualizing the particular analysis result to generate the visualized analysis result.

6. The method according to claim 1, wherein presenting the visualized information in the virtual world comprises:
   transmitting the generated visualized information to the at least one virtual reality device via a network to present the generated visualized information in the virtual world.

7. The method according to claim 1, wherein the at least one virtual reality device comprises a first virtual reality device and a second virtual reality device, and the method further comprises:
   receiving a request for changing the visualized information from the first virtual reality device;
   changing the visualized information based on the request; and
   presenting the changed visualized information in the virtual world displayed by the first virtual reality device and the second virtual reality device.

8. An electronic device, comprising:
   at least one processing unit; and
   at least one memory coupled to the at least one processing unit and storing instructions configured to be executed by the at least one processing unit, wherein the instructions, when executed by the at least one processing unit, cause the electronic device to perform actions comprising:
   acquiring original information associated with at least one infrastructure comprising one or more physical devices for information processing in a real world, wherein the original information comprises original hardware information associated with one or more hardware components of the one or more physical devices in the at least one infrastructure, and the original hardware information is acquired from the one or more physical devices in the at least one infrastructure;
   visualizing at least a portion of the original information to generate visualized information, wherein the visualized information comprises visualized original hardware information associated with the one or more hardware components of the one or more physical devices in the at least one infrastructure; and
   presenting the visualized information in a virtual world displayed by at least one virtual reality device, wherein the virtual world simulates the real world and comprises a virtual representation of the at least one infrastructure;
   wherein generating the visualized information comprises:
      determining a corresponding attention degree of a user of the at least one infrastructure;
      determining, in the at least one infrastructure, one infrastructure whose attention degree exceeds a threshold attention degree as a target infrastructure;
      selecting part of the original hardware information associated with the target infrastructure from the original hardware information; and
      visualizing the selected part of the original hardware information to generate the visualized original hardware information.

9. The device according to claim 8, wherein acquiring the original information further comprises:

acquiring original environmental information from a sensor configured to monitor the at least one infrastructure.

10. The device according to claim 9, wherein generating the visualized information further comprises:
   acquiring an environmental information fusion model configured to determine a particular environmental information to be provided to the user based on the original environmental information;
   applying the original environmental information to the environmental information fusion model to determine the particular environmental information to be provided to the user; and
   visualizing the particular environmental information to be provided to the user to generate the visualized environmental information.

11. The device according to claim 8, wherein acquiring the original information further comprises at least one of the following:
   acquiring original data processing information associated with data processing from the at least one infrastructure; and
   acquiring additional information from at least one database associated with the at least one infrastructure, wherein the at least one database comprises at least one of the following: a historical hardware information database, a historical environmental information database, a knowledge database, a risk model database, an expert database, a troubleshooting process database, and an operation process database.

12. The device according to claim 8, wherein generating the visualized information further comprises:
   analyzing the original information by using a data analysis model to obtain a particular analysis result, wherein the analysis result comprises at least one of operation advice, maintenance advice, and prediction advice for the at least one infrastructure; and
   visualizing the particular analysis result to generate the visualized analysis result.

13. The device according to claim 8, wherein presenting the visualized information in the virtual world comprises:
   transmitting the generated visualized information to the at least one virtual reality device via a network to present the generated visualized information in the virtual world.

14. The device according to claim 8, wherein the at least one virtual reality device comprises a first virtual reality device and a second virtual reality device, and wherein the instructions, when executed by the at least one processing unit, cause the electronic device to perform further actions comprising:
   receiving a request for changing the visualized information from the first virtual reality device;
   changing the visualized information based on the request; and
   presenting the changed visualized information in the virtual world displayed by the first virtual reality device and the second virtual reality device.

15. A computer program product tangibly stored on a non-transitory computer-readable medium and comprising machine-executable instructions, wherein the machine-executable instructions, when executed, cause a machine to perform steps of a method for information display, the steps of the method comprising:
   acquiring original information associated with at least one infrastructure comprising one or more physical devices for information processing in a real world, wherein the original information comprises original hardware information associated with one or more hardware components of the one or more physical devices in the at least one infrastructure, and the original hardware information is acquired from the one or more physical devices in the at least one infrastructure;
   visualizing at least a portion of the original information to generate visualized information, wherein the visualized information comprises visualized original hardware information associated with the one or more hardware components of the one or more physical devices in the at least one infrastructure; and
   presenting the visualized information in a virtual world displayed by at least one virtual reality device, wherein the virtual world simulates the real world and comprises a virtual representation of the at least one infrastructure;
   wherein generating the visualized information comprises:
      determining a corresponding attention degree of a user of the at least one infrastructure;
      determining, in the at least one infrastructure, one infrastructure whose attention degree exceeds a threshold attention degree as a target infrastructure;
      selecting part of the original hardware information associated with the target infrastructure from the original hardware information; and
      visualizing the selected part of the original hardware information to generate the visualized original hardware information.

16. The computer program product according to claim 15, wherein acquiring the original information further comprises:
   acquiring original environmental information from a sensor configured to monitor the at least one infrastructure.

17. The computer program product according to claim 15, wherein acquiring the original information further comprises at least one of the following:
   acquiring original data processing information associated with data processing from the at least one infrastructure; and
   acquiring additional information from at least one database associated with the at least one infrastructure, wherein the at least one database comprises at least one of the following: a historical hardware information database, a historical environmental information database, a knowledge database, a risk model database, an expert database, a troubleshooting process database, and an operation process database.

18. The computer program product according to claim 15, wherein generating the visualized information further comprises:
   analyzing the original information by using a data analysis model to obtain a particular analysis result, wherein the analysis result comprises at least one of operation advice, maintenance advice, and prediction advice for the at least one infrastructure; and
   visualizing the particular analysis result to generate the visualized analysis result.

19. The computer program product according to claim 15, wherein presenting the visualized information in the virtual world comprises:
   transmitting the generated visualized information to the at least one virtual reality device via a network to present the generated visualized information in the virtual world.

20. The computer program product according to claim 15, wherein the at least one virtual reality device comprises a first virtual reality device and a second virtual reality device, and the steps of the method further comprise:
- receiving a request for changing the visualized information from the first virtual reality device;
- changing the visualized information based on the request; and
- presenting the changed visualized information in the virtual world displayed by the first virtual reality device and the second virtual reality device.

\* \* \* \* \*